Aug. 3, 1943.                C. M. ZOLL                2,325,993
                    AIRPLANE CARRIER AND SEADROME
                       Filed July 2, 1941      7 Sheets-Sheet 1

Inventor
Carl M. Zoll,
By [signature]
Attorney

Aug. 3, 1943.      C. M. ZOLL      2,325,993
AIRPLANE CARRIER AND SEADROME
Filed July 2, 1941      7 Sheets-Sheet 4

Inventor
Carl M. Zoll,
By
Attorney

Aug. 3, 1943.  C. M. ZOLL  2,325,993
AIRPLANE CARRIER AND SEADROME
Filed July 2, 1941  7 Sheets-Sheet 5
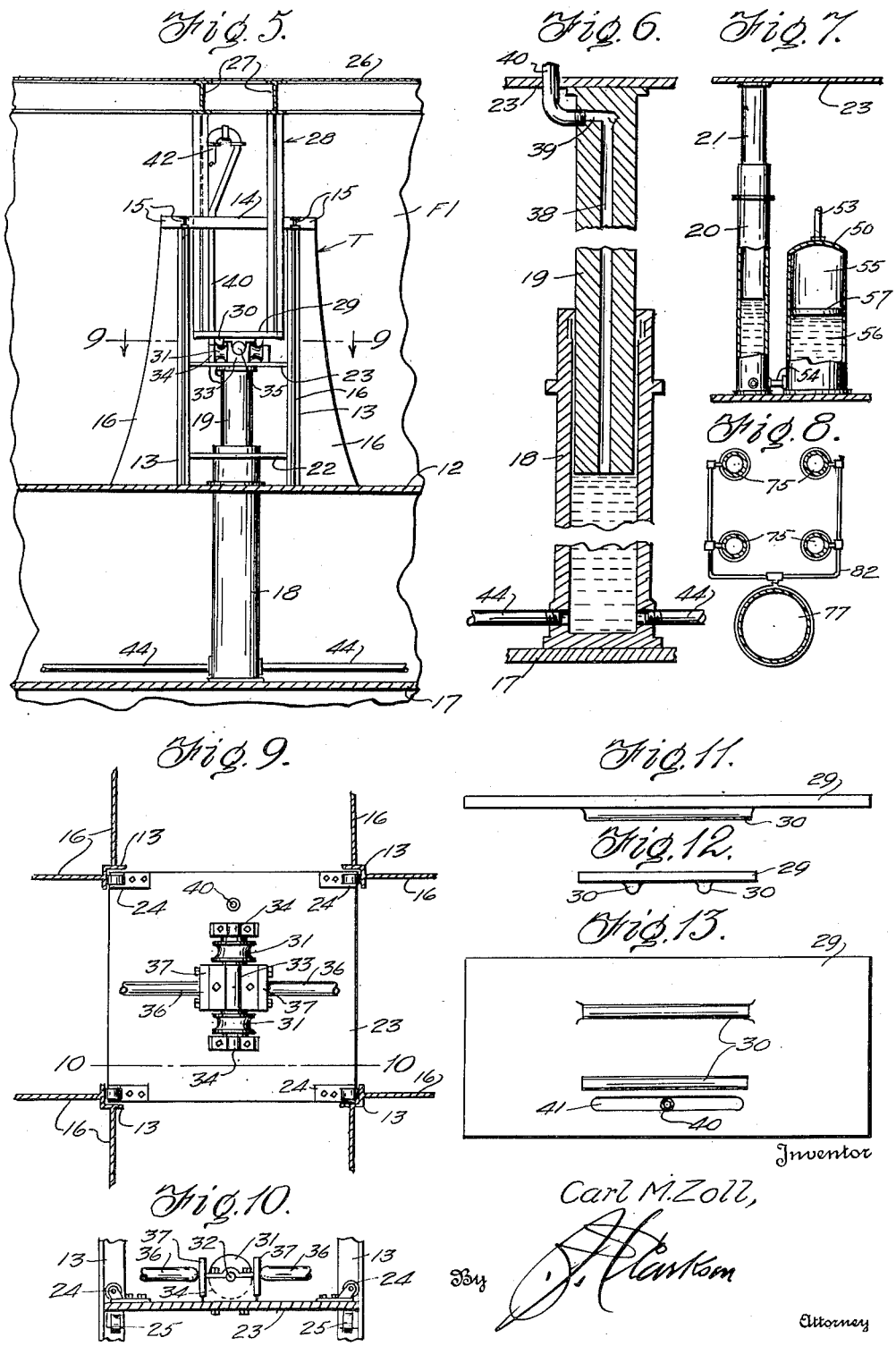

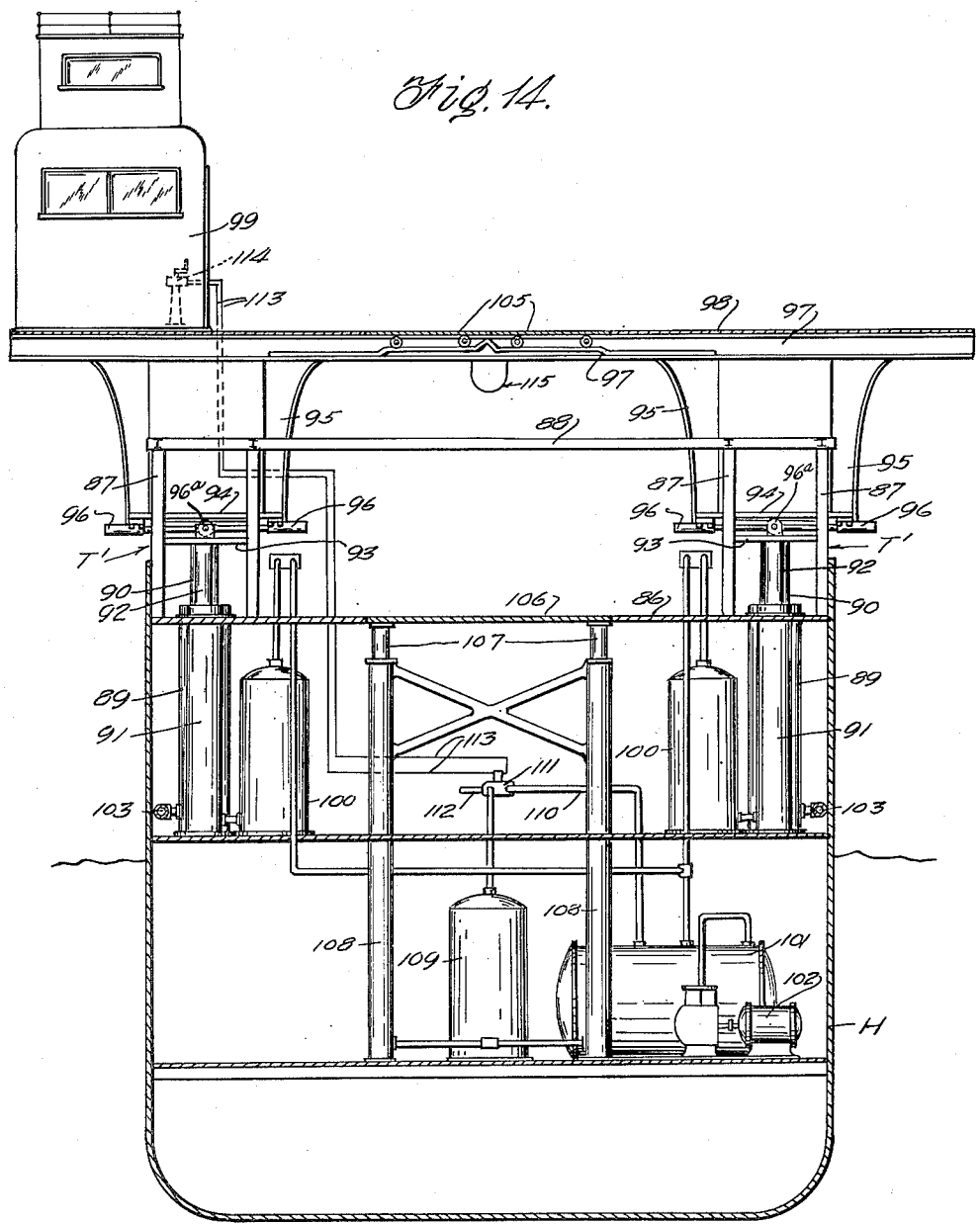

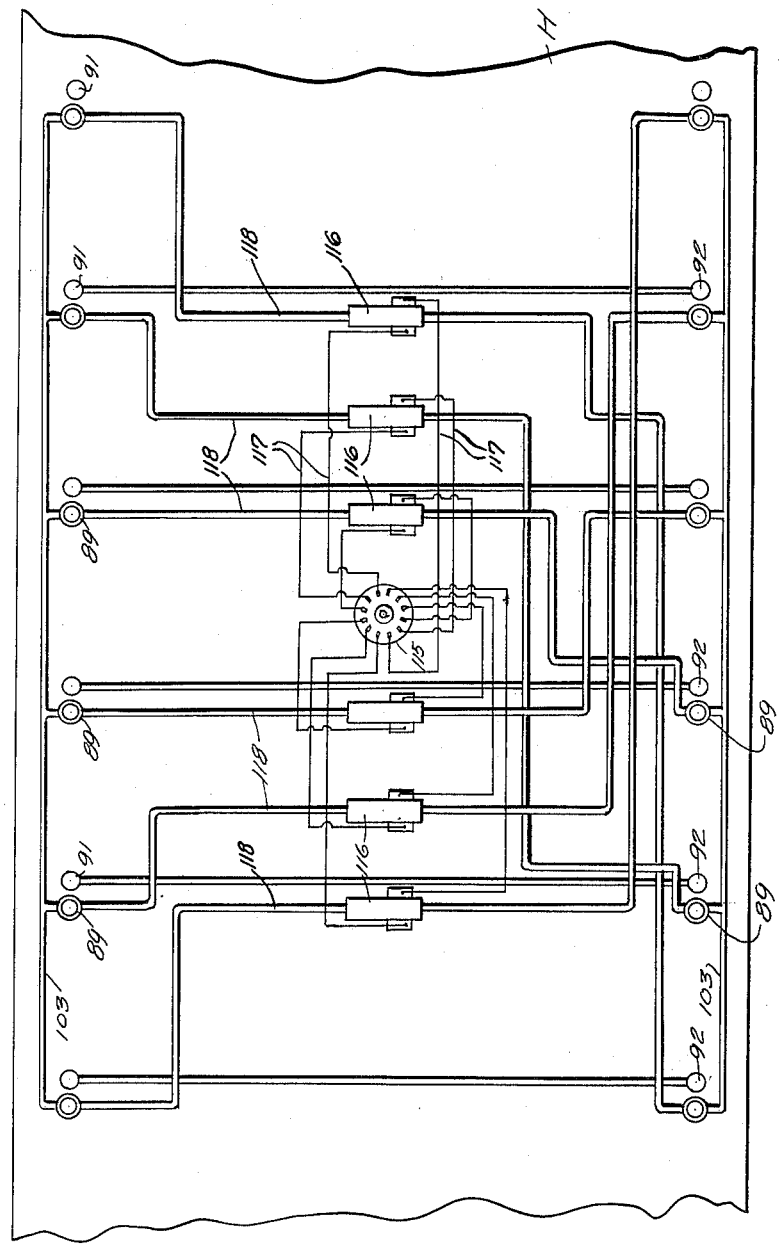

Patented Aug. 3, 1943

2,325,993

UNITED STATES PATENT OFFICE 2,325,993

AIRPLANE CARRIER AND SEADROME

Carl M. Zoll, Dundalk, Md., assignor to Universal Hydraulic Stress Equalizer, Inc., Dundalk, Md.

Application July 2, 1941, Serial No. 400,833

17 Claims. (Cl. 114—43.5)

This invention relates to water supported platforms for the landing and taking off of aircraft and typical of such platforms are seadromes and airplane carriers.

In such devices as seadromes one of the principal difficulties hitherto experienced has been the tendency of such a platform or landing field to assume positions inclined to the horizontal due to wave action on the floats supporting the platform, the inclination of the platform momentarily varying both in degree of inclination and in the direction of the incline. Such variations of inclination make it very difficult for a pilot to properly land an airplane as it is impossible, especially when rough seas prevail, for him to determine what inclination the platform will have and at what level it will be at the time the landing wheels of the airplane contact the platform surface.

It is one principal object of the present invention to provide a novel and efficient means of supporting a seadrome platform so that under all conditions of the sea the platform will remain in a substantially horizontal plane, the variation from the horizontal, if any, being of such an inappreciable extent as to lend no interference to the proper landing or taking off of an airplane.

A second important object of the invention is to provide novel supporting means for an airdrome platform that the platform will not only remain substantially level under all sea conditions but will also remain in substantially the same vertical position and free from abrupt rises and falls of level.

In airplane carriers the same conditions tend to exist. The landing platform or flying deck is, with ordinary construction, subject to all the motions of the ship of which it forms a part. That is, it is subject to rolling and pitching motions, variations in vertical position and to combinations of two or more of such variations from the normal position of the deck when the ship is in calm water such as a sheltered harbor.

I am aware that efforts have been made to compensate or correct the effects produced by pitching and rolling by supporting the flying deck of a ship centrally at a single point on which the deck may rock as the hull beneath rolls and pitches. However, such arrangements are impractical because the use of any single support device for a deck of such a large area requires a cantilever construction beneath it to give it the necessary rigidity and to support it throughout its length and width. Consequently the weight of the deck and its supporting structure must be so great as to make any ship of ordinary beam in proportion to its length extremely top-heavy and subject to dangerous rolling.

It is a further object of the present invention to provide improved means for supporting such a flying deck whereby the under structure of the deck may be of no heavier construction than that ordinarily used for such a deck and yet the deck be so carried from the ship hull as to maintain a substantially horizontal position independently of the pitching and rolling of the hull and wherein the normal height of the deck will vary but little under any weather and sea conditions.

With the above and other objects in view, the invention consists in general of certain novel details of construction and combinations of parts hereinafter fully described, illustrated in the accompanying drawings and particularly pointed out in the appended claims.

In the accompanying drawings like characters of reference indicate like parts in the several views, and:

Figure 5 is an enlarged view of a portion of Figure 2 showing one of the tower arrangements shown therein.

Figure 6 is a greatly enlarged vertical diametric section on the line 6—6 of Figure 4 through one of the main or stress equalizing cylinders used in the invention.

Figure 7 is an enlarged view partly in elevation and partly in section showing the pneumohydraulic means for supporting the deck structure at each tower.

Figure 8 is a detail section on the line 8—8 of Figure 4.

Figure 9 is an enlarged section on the line 9—9 of Figure 5.

Figure 10 is a section on the line 10—10 of Figure 9.

Figure 11 is an edge elevation of a certain pedestal bottom plate used at each tower of the invention.

Figure 12 is a view similar to Figure 11 but at right angles thereto.

Figure 13 is a bottom view of the plate shown in Figures 11 and 12.

Figure 14 is a view similar to Figure 4 but showing the arrangement for a single hull or airplane carrier.

Figure 15 is a view similar to Figure 3 but showing the arrangement for an airplane carrier.

Figure 16 is a detail view showing a contact closer used herewith.

Figure 17 is a detail showing the action of certain dash-pots used herein.

Figure 1:
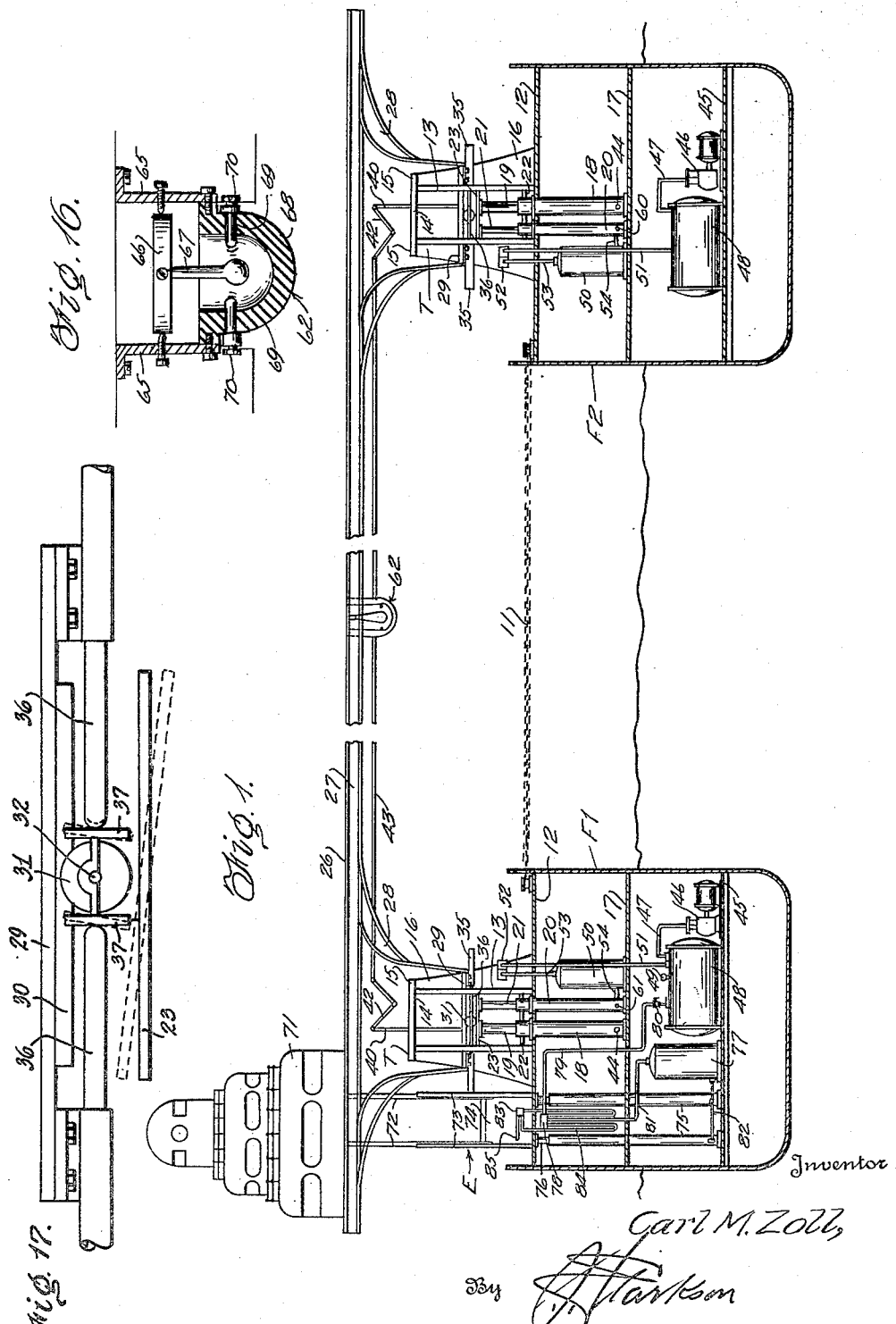
Figure 1 is a transverse or athwartship section showing a pair of hulls or flotation means and a seadrome deck supported thereon.
Figure 2:
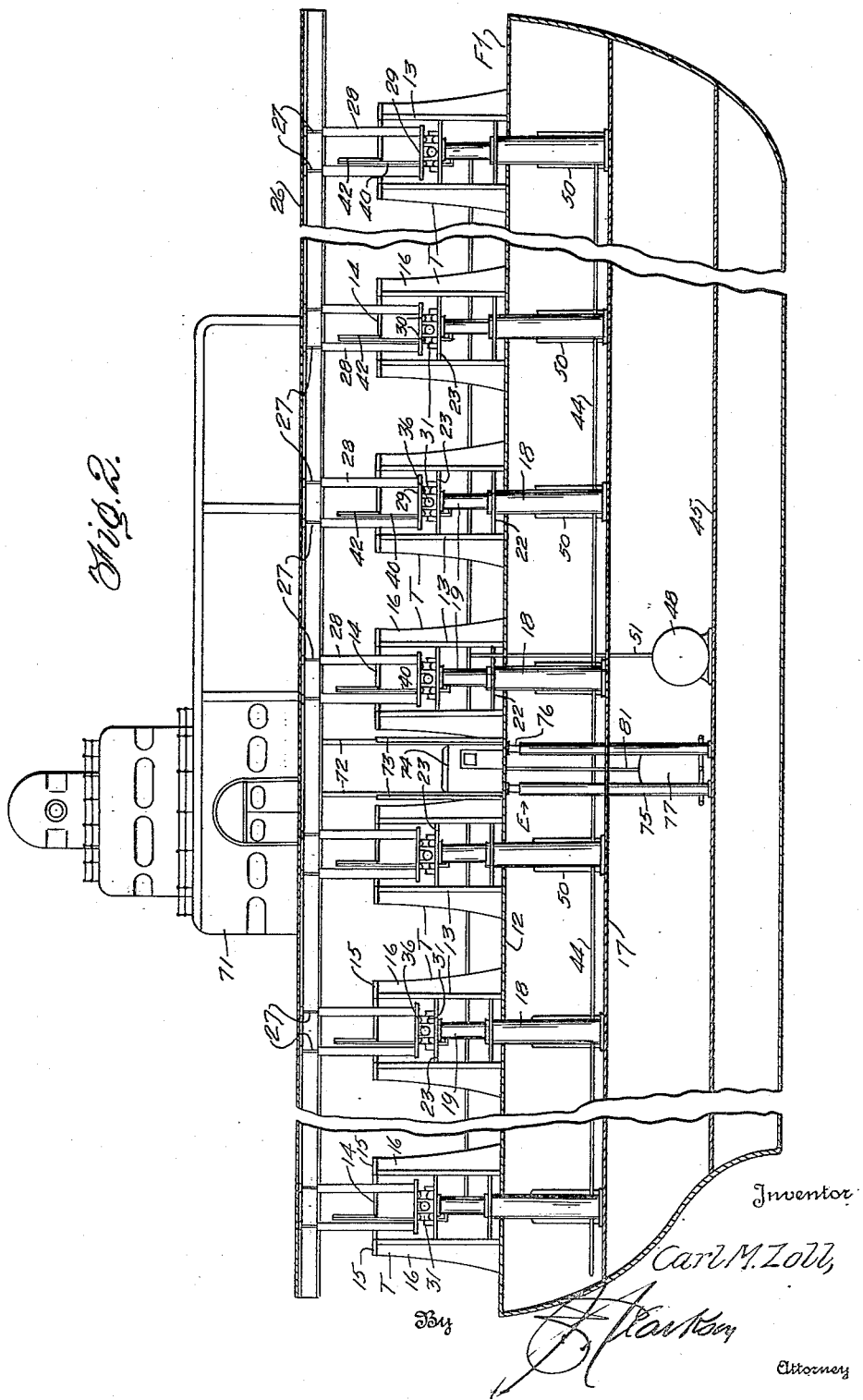
Figure 2 is a view from the left side of Figure 1 with the left hand hull in section.

In the form of the invention shown in Figures 1 to 13 the arrangement is such as to provide a relatively large area suitable for use as a fixed landing station for land planes in transoceanic flights, the seadrome thus formed being adapted to be anchored in any desired place. In this arrangement there is shown a pair of spaced hulls or flotation means F1 and F2 anchored as by the anchors 10 and held in proper parallel relation by cables 11 or other suitable means. These hulls are preferably alike in dimensions and load carrying capacity and are of suitable form as to promote stability and limit, as far as possible, all pitching and rolling motions of the hulls. While but two hulls are here shown it will be obvious from what follows that three or more hulls may be arranged side by side and also two or more hulls may be arranged in line ahead and parallel to other similarly arranged hulls.

As here shown each hull has a series of spaced towers T arranged along the longitudinal median line of the hull. These towers are all of like construction. Each of these towers is here shown as mounted on the upper deck 12 of the hull and includes vertical angle irons 13 arranged at the four corners of a rectangle and braced at the top by a rectangular structural steel frame 14 having projecting arms 15. Bracing webs 16 are welded or otherwise secured to the arms 15 and angle irons 13 so that there is thus formed a rigid structure which is firmly secured in position on the deck 12. Below the deck 12 is a deck 17 and on this deck there is provided for each tower a vertically disposed hydraulic ram including a cylinder 18 and a plunger 19. The upper part of each ram extends within the limits of the rectangle defined by the corner posts or angles 13 of the respective tower. This ram is preferably termed a compensating or leveling equalizing ram. Alongside of each equalizing ram is a similar but somewhat smaller load supporting ram comprising a cylinder 20 and a plunger 21. The upper ends of the cylinders 18 and 20 are braced to the tower by a plate 22 secured to the corner posts of the tower. Fixed to the upper ends of the plungers 19 and 21 is a plate 23 the corners of which engage in the angles 13 as shown in Figures 9 and 10. In order that this plate may have smooth vertical movement without great friction in the tower the plate carries on its upper surface rollers 24 which engage the inner faces of the angles 13 to hold the plate itself out of contact with the angles in one direction. Also similar rollers 25 are provided on the under side of the plate 23 and engage the angles 13 to hold the plate out of contact with these angles in a direction at right angles to that held by the rollers 24. Thus the plate 23 is freely movable vertically under the influence of any movement of the plungers 19 and 21. The landing and take off deck 26 is provided with an under structure which includes transverse girders 27 arranged in pairs each pair of which extends from one of the towers T of the hull F1 to the corresponding tower of the hull F2. The ends of these girders extend beyond the towers to overhang the remote sides of the hulls. Each pair of girders is provided at each of its associated towers with a downwardly extending stool or pedestal 28 having at its lower end a bottom plate 29 of rectangular form. This plate is sufficiently narrow to be freely slidable athwartships between the corner angles 13 and has a length such as to project beyond the tower at opposite sides thereof. Extending lengthwise of the under side of each plate 29 is a pair of parallel ribs 30 of substantially semicircular cross-section. On the corresponding plate 23 is a pair of grooved rollers 31 supported on a shaft 32 which is supported in a central bearing 33 and lateral bearings 34. Secured beneath each plate 29 at each end thereof is a pneumatic dash-pot cylinder 35 wherein is a plunger 36 having its end engaging against a plate 37 fixed to the central bearing 33. By means of the dash-pots of each plate 29 longitudinal movement of the girders 27 with respect to the associated tower is resisted but yet is permitted against such resistance so that rolling motion of a hull can take place without improperly stressing the structures.

The plunger 19 has an axially disposed bore 38 which extends up from the bottom of the plunger to a point in spaced relation to its upper end where it communicates with a radial passage or bore 39 into which is screwed one end of a pipe 40 which is bent to extend vertically up through the plate 23 and through a slot 41 extending through the plate 29 parallel to the ribs 30. This slot thus permits the plate 29 to move athwartships of the hull without bending the pipe 40. At each tower the upper end of the pipe 40 is connected to one end of a flexible swinging joint 42 or other expansion joint and the joint 42 of each tower on one hull is connected by a pipe 43 to the joint 42 of the corresponding tower on the other hull. Thus the plungers 19 of one hull are pipe connected with the plungers 19 of the other hull in such manner that the towers of one hull may, as by rolling of one or both hulls, swing toward and from the towers of the other hull without interference with the pipe connections. On each hull the bottom portions of the cylinders 18 are connected in series by pipes 44. By this arrangement movement of one hull by the sea at any tower to rise or fall with respect to any other tower of either hull will be compensated by flow of oil between the several cylinders. Thus, if the hull F1 rises on a swell while the other hull F2 fails to rise equal or drops into the trough of a sea the cylinders 18 of hull F1 will move upwardly with the hull and oil will flow through the pipes 40 and 43 to the cylinders 18 of the other hull F2 in accordance with the difference in height of the two hulls so that the supporting pressures of the several cylinders 18 will remain constant. Similarly, if one hull pitches so that the bow is higher or lower than the stern oil will flow from the higher cylinders 18 to the lower cylinders 18 through the pipes 44 and constant pressure will obtain in all cylinders 18. Obviously any effects produced by combined bodily and pitching movements of the hulls with respect to each other will be similarly compensated by flow of oil both through the pipes 43 and through the pipes 44. By these arrangements the hulls are free to move while the platform remains level.

On the lower deck 45 is located an air compressor unit 46 which is connected by a pipe 47 to a main storage tank 48 provided with suitable temperature and pressure gauges 49. Adjacent each of the cylinders 20 is a pneumo-hydraulic tank 50. A pipe 51 extends from the tank 48 to a control valve indicated in outline at 52 and from this control valve a pipe 53 extends to the upper part of tank 50. The lower end of the tank 50 is connected by a nipple 54 with the lower end of the cylinder 20. The same piping arrangement extends from the tank 48 for each cylinder 50. As shown in Figure 7 the upper part of the tank 50 provides an air chamber 55 while the lower part forms an oil chamber 56, a piston 57 being disposed between the two to prevent splashing and retard evaporation of the oil. By means of the several valves 52 the air pressure within the cylinders 50 and consequently the oil pressure in the cylinders 20 is so regulated that each piston 21 supports its proper proportion of the total dead load of the platform and any live load which may be imposed thereon such as that produced by airplanes, passengers, baggage or freight and the like.

Figure 3:
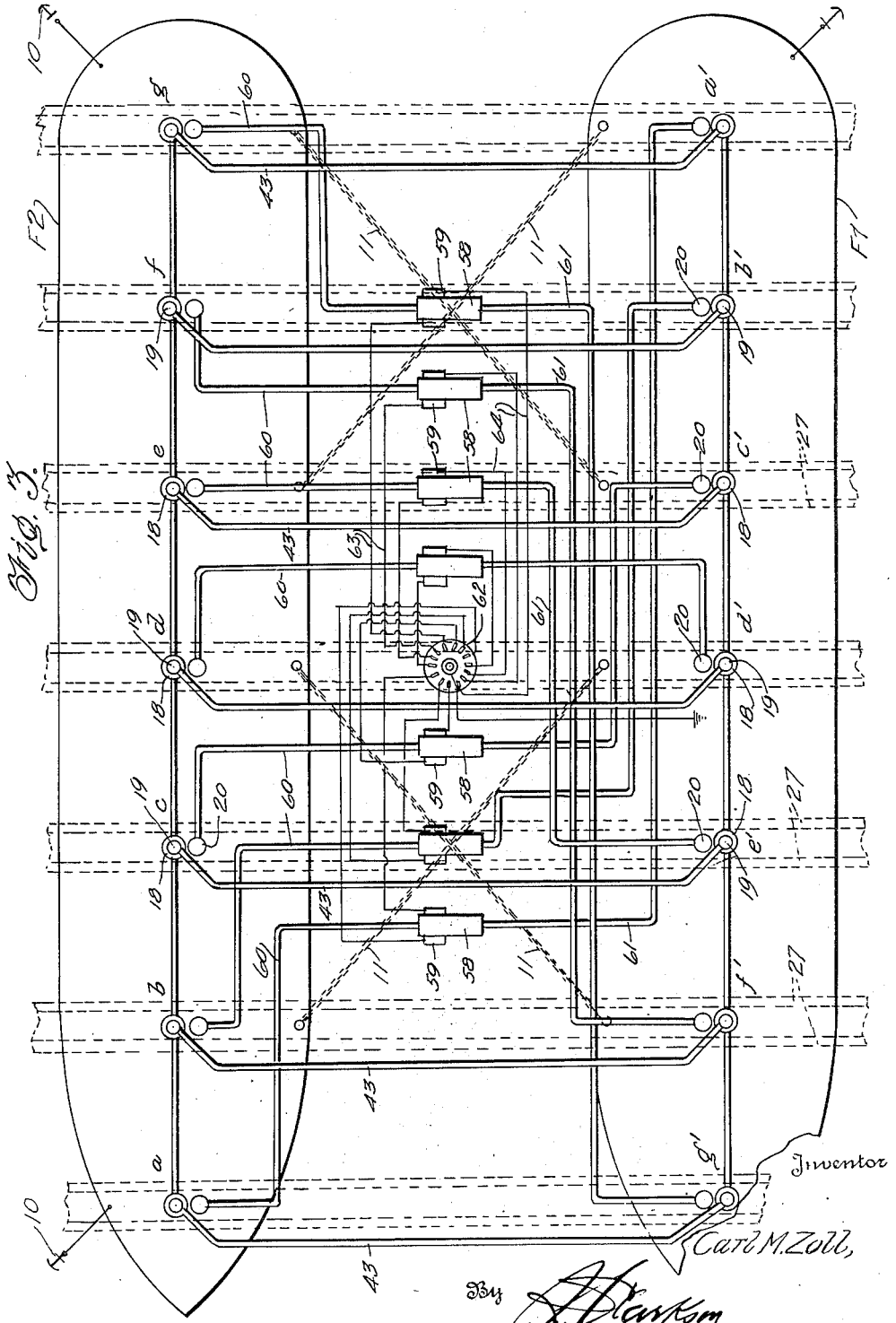
Figure 3 is a diagrammatic plan view illustrating an automatic means for maintaining the landing deck or field of the seadrome in horizontal position independently of the variations in positions of the hulls or flotation means.
Figure 4:
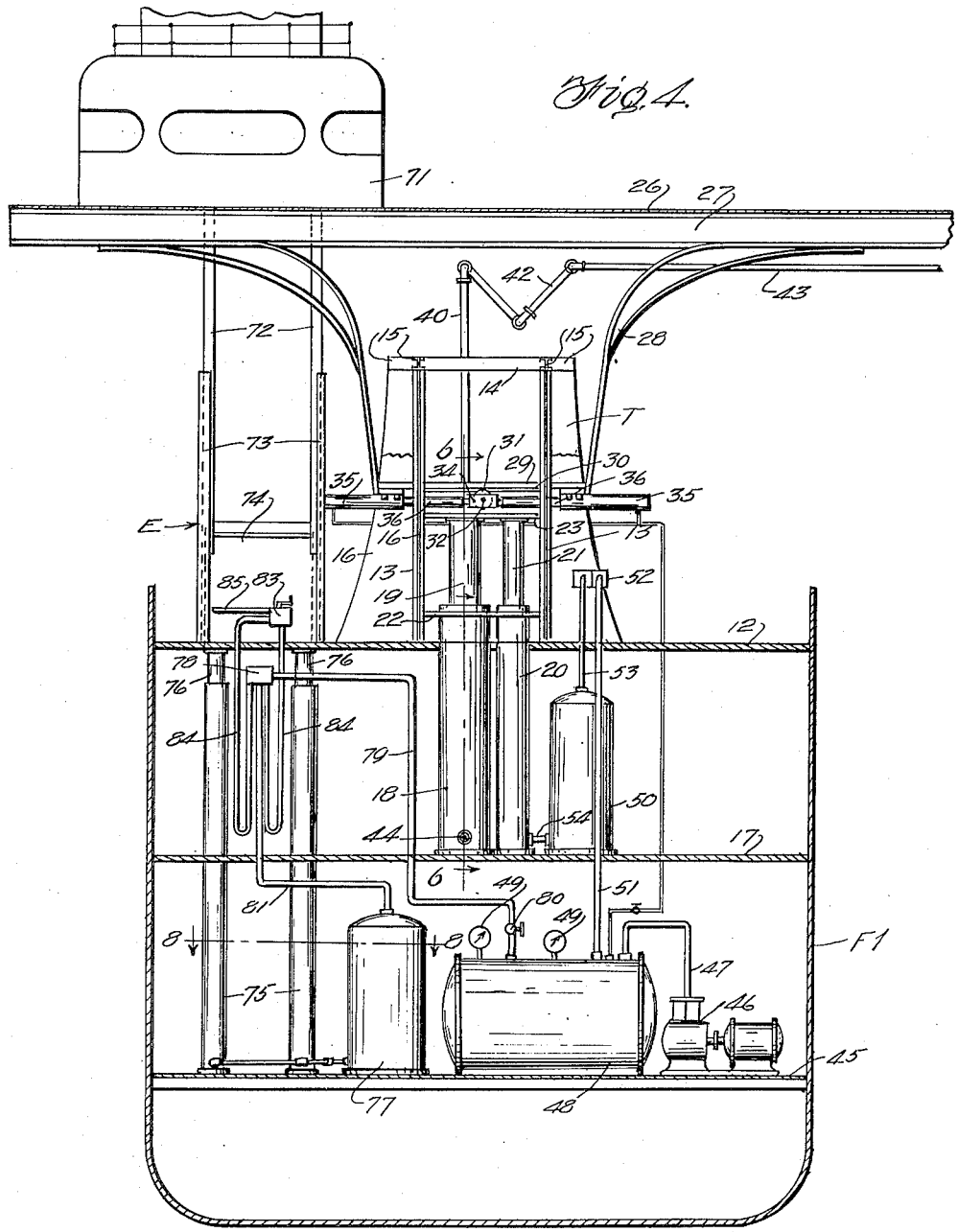
Figure 4 is an enlarged view of the left hand portion of Figure 1.

As diagrammatically illustrated in Figure 3 there is provided a set of pumps 58 each driven by a reversing motor 59. These pumps may be located in any convenient place. For instance, they may be suspended beneath the platform. As shown in Figure 3 there are seven sets of cylinders 18 and 20 in each hull and the number of pumps is also seven. The pumps being reversible either end may be taken as the outlet while the other forms the inlet. For purposes of a clear understanding of the device and its operation the sets of cylinders in hull F2 have been lettered from bow to stern as a, b, c, d, e, f, and g, and the same characters primed as a', b', c', d', e', f', and g' are used for hull F1, but the lettering runs from stern to bow. It will be observed that, there being an odd number of sets in each hull, the sets d and d' lie opposite each other but the like lettered remaining sets are displaced diagonally. Thus the set a is as far forward of the set d as the set a' is aft of the set d', and similarly with respect to b and b', c and c', e and e', f and f', and g and g'. Each of the pumps 58 has pipe connection at one end with one of the cylinders 20 as at b, and at its other end with a correspondingly lettered cylinder, as at b'. At 62 is a gravity actuated multiple pole circuit closer a typical construction of which will presently be described. There being fourteen cylinders 20 in all the circuit closer is provided with fourteen poles or contact points seven of which lie to starboard of a fore and aft line passing through the center of the circuit closer while the remaining seven lie to port of that line. The circuit closer 62 is fixed centrally below the platform. Each starboard contact point is connected by a conductor 63 to a respective pump motor 59 in such manner as to cause the pump to force oil through the respective pipe 60 and draw it through the respective pipe 61. The diametrically opposite port contact point is connected by a conductor 64 to the same motor in such manner as to cause it to rotate in the opposite direction and thus force oil through the pipe 61 and draw it through the pipe 60.

To now understand the manner in which any tilting of the platform from the horizontal is at once corrected we will consider a concrete example. Let it be supposed that the forward port corner of the platform drops while the after starboard corner rises correspondingly. The circuit closer will act to close a circuit through the conductor 64 leading to the motor 59 for the pump controlling the cylinders 20 of sets g and g'. This will cause the pump to act in such manner that some of the oil will flow from cylinder 20 of set g to the corresponding cylinder of set g' and the plungers of this cylinder will respectively move down and up thus leveling the platform. As soon as the platform is restored to proper level the circuit opens, the platform of the plungers ceases and the platform remains level until further disturbance occurs. Obviously if the platform tilts from horizontal in any other direction a like readjustment to horizontal will be caused by operation of the appropriate pump.

In the construction of the circuit closer a type such as that shown in Figure 16 may be employed although other gravity operated circuit closers may be used. In this form a pair of brackets 65 support a gimbal device 66 from which depends a plumb-bob 67 forming the movable element or contact of the circuit closer. The bob 67 thus has universal swinging movement. The brackets 65 also support a bowl 68 of insulating material and extending through the wall of this bowl is an annular series of evenly spaced contact members 69 surrounding the bob 67 and normally spaced therefrom. The outer ends of the contacts 69 are provided with binding screws 70 for attachment of the conductors leading to the pump motors 58.

On the landing deck or platform is a structure 71 designed for the usual offices and the like associated with an airplane landing field. In order to afford easy communication between this structure and the hull F1 which lies beneath it an elevator, indicated in general at E, is employed. In the construction of this elevator provision is made for changes in the distance between the platform and the hull and to that end guides 72 are carried by the platform and depend therefrom to engage with guides 73 fixed to and extending up from the deck 12. The connection of the guides 72 with the platform is such as to permit athwartships movement of the platform independently of said guides so that the latter may rise and fall freely in the guides 73 as the platform rises and falls with respect to the hull. A cage 74 is vertically movable in the guides, the upper part of the cage at all times engaging between the guides 72. Beneath the cage 74 is a set of four cylinders 75 each located below a respective corner of the cage. Plungers 76 work in the cylinders 75 and support the cage at their upper ends. At 77 is a pneumo-hydraulic cylinder of the same general construction as the cylinders 50. That is, the upper part of the cylinder 77 forms an air chamber and the lower part forms an oil chamber. At 78 is a manifold and a pipe 79 leads from the tank 48 to this manifold and is provided with a valve 80. A pipe 81 connects the manifold 78 with the storage cylinder 77 at the top of the latter. By this means the desired degree of air pressure is obtained in the cylinder or tank 77. The lower part of the tank 77 is connected, as shown in Figure 8, by piping 82 so that uniform pressure is exerted in the cylinders 75. In the cage 74 and travelling therewith is a control valve 83 which is connected by flexible pipes 84 with the manifold 78. A blow-off pipe 85 also leads from the valve 83. With the valve 80 open turning of the valve 83 to one position places the pipe 79 in communication with the pipe 81 and air under pressure is admitted to the storage cylinder or tank 77 which thus exerts pressure in the cylinders 75 and causes the elevator to rise. In another position of the valve the pipe 79 is closed off and the pipe 81 is connected through a pipe 84 and thus to the blow-off 85 so that pressure is relieved on the tank 77 and thus in the cylinders 75 and the elevator moves downwardly.

In the form of the invention shown in Figures 14 and 15 the invention is shown as adapted for use as an air-plane carrier of the type used for war purposes. In this form there is but a single hull H. Along each side of the ship on the upper deck 86 is a row of towers T' preferably evenly spaced along fore and aft lines. Each of these towers includes angle iron corner posts 87 and the towers on one side are opposite the towers on the other, each tower being preferably connected with its opposite tower by bracing girders such as 88. Each tower has associated therewith a cylinder 89 and plunger 90 somewhat similar to the cylinder 20 and plunger 21 and a cylinder 91 and plunger 92 somewhat similar to the cylinder 18 and plunger 19 of the first form. A sliding plate 93 of similar construction to the plate 23 is mounted on the plungers 90 and 92 and supports a plate 94 similar to the plate 29 and forming the bottom of a pedestal or stool 95. The plate 94 is permitted athwartship movement which is resisted by dash-pots 96. These dash pots are secured beneath said plate and have plungers engaging against a roll provided member 96a fixed on the plate 93. The pedestals 95 are connected by girders 97 carrying a flight deck 98 on which is the usual control bridge and house 99. Associated with each cylinder 91 is a pneumo-hydraulic cylinder or tank 100 receiving air under pressure from a main storage tank 101 supplied by a compressor unit 102. The cylinders 89 are conected in longitudinal series at each side by piping 103. The flight deck 98 is provided with a hatchway adjacent each end normally closed by flush deck doors 105 which may be opened by sliding movement. The deck 86 also has corresponding hatchways normally closed by an elevator floor 106 of somewhat smaller dimensions transverse the ship than the flight deck hatchway so that, when the floor 106 is raised to the level of the deck 98 the latter may move athwartships without interfering with the floor 106. The floor 106 is supported on plungers 107 working in cylinders 108 and these cylinders are connected to a pneumo-hydraulic storage tank 109. A pipe 110 connects the tanks 101 and 109 and flow through this pipe is controlled by a valve 111 having a blow off 112. The valve 111 is electrically controlled through conductors 113 leading to a control stand 114 in the structure 99. As shown in Figure 15 the structure of the flight deck carries centrally a multiple circuit closer 115 and motor driven pumps 116 have their motors connected by wiring 117 to the individual contacts of this circuit closer. These pumps are connected to the bottoms of the cylinders 89 by pipes 118. The motor driven pumps may be located at any desired place between decks of the ship since the wiring connections can be readily carried from the circuit closer 115 to any place in the ship. With this arrangement if the ship's hull rolls to port one or more of the pumps operate to urge oil into the corresponding port cylinders from which it is distributed to the other port cylinders through the port pipe line 103, the oil being drawn from the starboard cylinders. Similarly if the ship pitches and the bow drops or the stern lifts the forward pumps will operate to cause oil flow into the forward cylinders and draw it from the after cylinders. Combined rolling and pitching similarly affect the pumping of oil to compensate for any variation from horizontal of the flight deck and to restore it to horizontal upon any slight tilting in any direction.

It will be seen that the detail construction of the two forms is very similar and the resultant operations of the second form are practically identical with those of the first form.

What is claimed, is:

1. In a device of the kind described, flotation means having a pair of series of spaced towers, one series being substantially parallel with the other, a platform spanning the space between the series of towers and having series of pedestals each associated with a respective tower and slidable transverse the tower, means limiting and yieldably resisting transverse movement of the pedestals relative to the towers, a set of hydraulic compensating devices each associated with a respective tower and supporting the respective pedestal, and piping interconnecting said compensating devices.

2. In a device of the kind described, flotation means having a pair of series of spaced towers, one series being substantially parallel with the other, a platform spanning the space between the series of towers and having series of pedestals each associated with a respective tower and slidable transverse the tower, means limiting and yieldably resisting transverse movement of the pedestals relative to the tower, a set of hydraulic compensating devices each associated with a respective tower and supporting the respective pedestal, and piping interconnecting said compensating devices, the lifts associated with each series of towers being connected to each other by said piping and the compensating devices of one series being connected transversely to the compensating devices of the other series in pairs.

3. In a device of the kind described, flotation means having a pair of series of spaced towers, one series being substantially parallel with the other, a platform spanning the space between the series of towers and having series of pedestals each associated with a respective tower and slidable transverse the tower, means limiting and yieldably resisting transverse movement of the pedestals relative to the tower, a set of hydraulic compensating devices each associated with a respective tower and supporting the respective pedestal, a second set of hydraulic compensating devices each associated with a respective tower and assisting in supporting a respective pedestal, each set of compensating devices thus forming a pair of series, piping connecting the compensating devices of each series of the first set with each other, and fluid conducting means connecting the compensating of one series of a set with the compensating of the second series of the same set.

4. In a device of the kind described, flotation means having a pair of series of spaced towers, one series being substantially parallel with the other, a platform spanning the space between the series of towers and having series of pedestals each associated with a respective tower and slidable transverse the tower, means limiting and yieldably resisting transverse movement of the pedestals relative to the tower, a set of hydraulic compensating devices each associated with a respective tower and supporting the respective pedestal, a second set of hydraulic compensating devices each associated with a respective tower and assisting in supporting a respective pedestal, each set of compensating devices thus forming a pair of series, piping connecting the compensating devices of each series of the first set with each other, fluid conducting means connecting the compensating devices of one series of a set with the compensating devices of the second series of the said set, pumps controlling the flow of liquid through the last mentioned piping, reversible electric-motors driving the pumps, and a gravity controlled circuit closer connected to the motors and causing actuation of respective motors upon slight tilting of the platform.

5. In a device of the kind described, flotation means having a pair of series of spaced towers, one series being substantially parallel with the other, a platform spanning the space between the series of towers and having series of pedestals each associated with a respective tower and slidable transverse the tower, means limiting and yieldably resisting transverse movement of the pedestals relative to the tower, a set of hydraulic compensating devices each associated with a respective tower and supporting the respective pedestal, a second set of hydraulic compensating devices each associated with a respective tower and assisting in supporting a respective pedestal, each set of compensating devices thus forming a pair of series, piping connecting the compensating devices of each series of the first set with each other, fluid conducting means connecting the compensating devices of one series of a set with the compensating devices of the second series of the same set, and pneumatic means controlling the pressures in the cylinders of the second set.

6. In a device of the kind described, flotation means having a pair of series of spaced towers, one series being substantially parallel with the other, a platform spanning the space between the series of towers and having series of pedestals each associated with a respective tower and slidable transverse the tower, means limiting and yieldably resisting transverse movement of the pedestals relative to the tower, a set of hydraulic compensating devices each associated with a respective tower and supporting the respective pedestal, a second set of hydraulic compensating devices each associated with a respective tower and assisting in supporting a respective pedestal, each set of compensating devices thus forming a pair of series, piping connecting the compensating devices of each series of the first set with each other, other piping connecting the compensating devices of one series of a set with the compensating devices of the second series of the said set, said fluid conducting means including pumps controlling the flow of liquid through the last mentioned means, reversible electric-motors driving the pumps, a gravity controlled circuit closer connected to the motors and causing actuation of respective motors upon slight tilting of the platform, and pneumatic means controlling the pressures in the cylinders of the second set.

7. In an airdrome, elongated flotation means having a deck, a platform spanning the flotation means and spaced thereabove in a normally horizontal position, series of spaced extensible means carried by the flotation means and supporting said platform adjacent its side edges, means actuating the extensible means to maintain the platform in substantially horizontal position independent of rolling and pitching movements of the flotation means, and a hydraulic elevator carried by the flotation means and movable between said deck and platform.

8. In an airdrome, elongated flotation means having a deck, a platform spanning the flotation means and spaced thereabove in a normally horizontal position, series of spaced extensible means carried by the flotation means and supporting said platform adjacent its side edges, means actuating the extensible means to maintain the platform in substantially horizontal position independent of rolling and pitching movements of the flotation means, a hydraulic elevator carried by the flotation means and movable between said deck and platform, said platform having a deck provided with a hatchway and the elevator having a floor entering in said hatchway to lie flush with the platform deck in upper position of the elevator, and doors normally closing said hatchway.

9. In combination, flotation means, a horizontal platform above said flotation means, stabilizing means carried by the flotation means for engagement with the platform and stabilizing the platform in horizontal position independently of rocking and pitching of the flotation means, and other stabilizing means carried by the flotation means for engagement beneath the platform and stabilizing the platform against unequal weight distribution on said platform.

10. In combination, flotation means, a horizontal platform above said flotation means, hydraulic stabilizing means carried by the flotation means for engagement with the platform and stabilizing the platform in horizontal position independently of rocking and pitching of the flotation means, and pneumo-hydraulic stabilizing means carried by the flotation means for engagement beneath the platform and stabilizing the platform against unequal weight distribution on said platform.

11. In combination, flotation means, a platform above said flotation means, a pair of series of hydraulic cylinders and pistons disposed between the flotation means and platform, each series being arranged adjacent a respective side of the platform, a second pair of cylinders and pistons similarly disposed and arranged, pneumatic means controlling hydraulic pressure in the cylinders of the second pair of series, the cylinders of each series of one of said pairs having fluid flow means connecting all of the cylinders to each other and fluid flow means connecting each cylinder of one series of a respective pair with a single cylinder of the other series of the same pair.

12. In combination, flotation means, a platform above said flotation means, a pair of series of hydraulic cylinders and pistons disposed between the flotation means and platform, each series being arranged adjacent a respective side of the platform, a second pair of cylinders and pistons similarly disposed and arranged, pneumatic means controlling hydraulic pressure in the cylinders of the second pair of series, the cylinders of each series of one of said pairs having fluid flow means connecting all of the cylinders to each other, the cylinders of one series of each pair being arranged opposite the cylinders of the other series of the same pair, and fluid flow means connecting each cylinder of one series of a respective pair with a diagonally disposed cylinder of the other series of the same series in pairs, the cylinders of each connected pair being equally spaced from the respective centers of the connected series.

13. In combination, flotation means, a platform above said flotation means, a pair of series of hydraulic cylinders and pistons disposed between the flotation means and platform, each series being arranged adjacent a respective side of the platform, a second pair of cylinders and pistons similarly disposed and arranged, pneumatic means controlling hydraulic pressure in the cylinders of the second pair of series, the cylinders of each series of one of said pairs having fluid flow means connecting all of the cylinders to each other, the cylinders of one series of each pair being arranged opposite the cylinders of the other series of the same pair, fluid flow means connecting each cylinder of one series of a respective pair with a diagonally disposed cylinder of the other series of the same series in pairs, the cylinders of each connected pair being equally spaced from the respective centers of the connected series, and fluid flow means connecting each cylinder of the one series of the remaining pair of series with the opposite cylinders of the other series of the last mentioned pair of series.

14. The combination with flotation means, of a platform spanning said flotation means, a pair of substantially parallel series of hydraulic compensating devices supporting the sides of said platform and supported by the flotation means, piping connecting the compensating devices of each series to each other, a second pair of substantially parallel series of hydraulic compensating devices similarly supporting the platform, pneumatic means controlling the pressures in the compensating devices of the second pair of series, and fluid conducting and actuating means connecting the compensating devices of one series of the second pair with the compensating devices of the corresponding second series of the second pair of compensating devices in pairs.

15. The combination with flotation means, of a platform spanning said flotation means, a pair of substantially parallel series of hydraulic compensating devices supporting the sides of said platform and supported by the flotation means, piping connecting the compensating devices of each series to each other, a second pair of substantially parallel series of hydraulic compensating devices similarly supporting the platform, pneumatic means controlling the pressures in the compensating devices of the second pair of series, fluid conducting means connecting the compensating devices of one series of the second pair of series with the compensating devices of the second series of said second pair of series in pairs, said fluid conducting means including pumps controlling the flow of liquid through the last mentioned means, reversible electric motors driving the pumps, and a gravity controlled circuit closer connected to the motors and causing actuation of respective motors upon slight tilting of the platform.

16. The combination with flotation means, of a platform spanning said flotation means, a pair of substantially parallel series of hydraulic compensating devices supporting the sides of said platform and supported by the flotation means, piping connecting the compensating devices of each series to each other, a second pair of substantially parallel series of hydraulic compensating devices similarly supporting the platform, pneumatic means controlling the pressures in the compensating devices of the second pair of series, piping connecting the compensating devices of one series of the first pair with the compensating devices of the other series of the first pair, and fluid conducting and actuating means connecting the compensating devices of one series of the second pair with the compensating devices of the other series of the second pair.

17. The combination with flotation means, of a platform spanning said flotation means, a pair of substantially parallel series of hydraulic compensating devices supporting the sides of said platform and supported by the flotation means, piping connecting the compensating devices of each series to each other, a second pair of substantially parallel series of hydraulic compensating devices similarly supporting the platform, pneumatic means controlling the pressures in the compensating devices of the second pair of series, piping connecting the compensating devices of one series of the first pair with the compensating devices of the other series of the first pair, fluid conducting means connecting the compensating devices of one series of the second pair with the compensating devices of the other series of the second pair, said fluid conducting means including pumps controlling the flow of liquid through the last mentioned fluid conducting means, reversible electric motors driving the fluid conducting means, and a gravity controlled circuit closer connected to the motors and causing actuation of respective motors upon slight tilting of the platform.

CARL M. ZOLL.